(12) United States Patent
Kamen et al.

(10) Patent No.: US 8,336,069 B1
(45) Date of Patent: Dec. 18, 2012

(54) METHOD AND SYSTEM FOR ADAPTIVE ELECTRONIC PROGRAMMING GUIDE

(75) Inventors: Yakov Kamen, Cupertino, CA (US); Leon Alexander Shirman, Redwood City, CA (US)

(73) Assignee: JLB Ventures LLC, Washington, DC (US)

( * ) Notice: Subject to any disclaimer, the term of this patent is extended or adjusted under 35 U.S.C. 154(b) by 2026 days.

(21) Appl. No.: 09/691,792

(22) Filed: Oct. 18, 2000

Related U.S. Application Data

(60) Provisional application No. 60/190,349, filed on Mar. 16, 2000.

(51) Int. Cl.
*G06F 3/00* (2006.01)
*G06F 13/00* (2006.01)
*H04N 5/445* (2011.01)

(52) U.S. Cl. ............... 725/39; 725/43; 725/44; 725/45; 725/47; 725/52

(58) Field of Classification Search .................. 725/37, 725/39, 43, 44, 45, 47, 52; 715/744, 745, 715/746, 747
See application file for complete search history.

(56) References Cited

U.S. PATENT DOCUMENTS

| | | | |
|---|---|---|---|
| 4,621,259 A | 11/1986 | Schepers et al. | |
| 5,233,333 A * | 8/1993 | Borsuk | 345/660 |
| 5,243,418 A | 9/1993 | Kuno et al. | |
| 5,414,773 A | 5/1995 | Handelman | |
| 5,479,268 A | 12/1995 | Young et al. | |
| 5,485,197 A | 1/1996 | Hoarty | |
| 5,502,504 A * | 3/1996 | Marshall et al. | 725/47 |
| 5,532,754 A | 7/1996 | Young et al. | |
| 5,550,576 A | 8/1996 | Klosterman | |
| 5,559,548 A * | 9/1996 | Davis et al. | 725/40 |
| 5,682,195 A * | 10/1997 | Hendricks et al. | 725/31 |
| 5,684,525 A | 11/1997 | Klosterman | |
| 5,704,837 A | 1/1998 | Iwasaki et al. | |
| 5,724,492 A | 3/1998 | Matthews, III et al. | |
| 5,737,028 A | 4/1998 | Bertram et al. | |
| 5,751,282 A | 5/1998 | Girard et al. | |
| 5,793,368 A * | 8/1998 | Beer | 715/747 |
| 5,798,785 A * | 8/1998 | Hendricks et al. | 725/46 |
| 5,808,613 A | 9/1998 | Marrin et al. | |
| 5,815,148 A * | 9/1998 | Tanaka | 715/746 |
| 5,818,441 A | 10/1998 | Throckmorton et al. | |
| 5,828,945 A | 10/1998 | Klosterman | |
| 5,841,563 A | 11/1998 | Effenberger | |
| 5,900,915 A | 5/1999 | Morrison | |
| 5,923,362 A | 7/1999 | Klosterman | |
| 5,926,168 A | 7/1999 | Fan | |
| 5,929,849 A | 7/1999 | Kikinis | |
| 5,940,073 A | 8/1999 | Klosterman et al. | |
| 5,956,456 A | 9/1999 | Bang et al. | |
| 5,977,964 A | 11/1999 | Williams et al. | |
| 5,999,167 A | 12/1999 | Marsh et al. | |
| 5,999,187 A | 12/1999 | Dehmlow et al. | |

(Continued)

FOREIGN PATENT DOCUMENTS

JP 410093880 A 4/1998
(Continued)

*Primary Examiner* — Dominic D Saltarelli
(74) *Attorney, Agent, or Firm* — Banner & Witcoff, Ltd.

(57) ABSTRACT

This invention provides a television schedule system and process that allows an electronic programming guide designer to add a capability to change program listing appearance adaptively, based on a signal from a user or broadcaster.

13 Claims, 1 Drawing Sheet

Adaptive Electronic Programming Guide diagram

U.S. PATENT DOCUMENTS

| | | | |
|---|---|---|---|
| 6,002,403 | A | 12/1999 | Sugiyama et al. |
| 6,029,195 | A | 2/2000 | Herz |
| 6,043,818 | A | 3/2000 | Nakano et al. |
| 6,061,055 | A | 5/2000 | Marks |
| 6,061,695 | A * | 5/2000 | Slivka et al. .................. 715/513 |
| 6,072,983 | A | 6/2000 | Klosterman |
| 6,075,575 | A | 6/2000 | Schein et al. |
| 6,078,348 | A | 6/2000 | Klosterman et al. |
| 6,081,271 | A | 6/2000 | Bardon et al. |
| 6,091,411 | A * | 7/2000 | Straub et al. .................. 715/747 |
| 6,144,376 | A * | 11/2000 | Connelly ........................ 725/44 |
| 6,167,188 | A | 12/2000 | Young et al. |
| 6,205,485 | B1 | 3/2001 | Kikinis |
| 6,223,347 | B1 * | 4/2001 | Watanabe et al. ............. 725/139 |
| 6,233,389 | B1 | 5/2001 | Barton et al. |
| 6,243,039 | B1 | 6/2001 | Elliot |
| 6,260,192 | B1 * | 7/2001 | Rosin et al. ...................... 725/39 |
| 6,266,098 | B1 * | 7/2001 | Cove et al. ..................... 348/563 |
| 6,271,831 | B1 | 8/2001 | Escobosa et al. |
| 6,281,898 | B1 * | 8/2001 | Nikolovska et al. .......... 715/848 |
| 6,292,187 | B1 * | 9/2001 | Gibbs et al. .................... 345/804 |
| 6,312,336 | B1 * | 11/2001 | Handelman et al. ............. 463/40 |
| 6,330,718 | B1 * | 12/2001 | Shah-Nazaroff et al. ....... 725/37 |
| 6,331,852 | B1 * | 12/2001 | Gould et al. .................. 345/419 |

FOREIGN PATENT DOCUMENTS

| | | |
|---|---|---|
| WO | WO 00/01149 A1 | 1/2000 |

\* cited by examiner

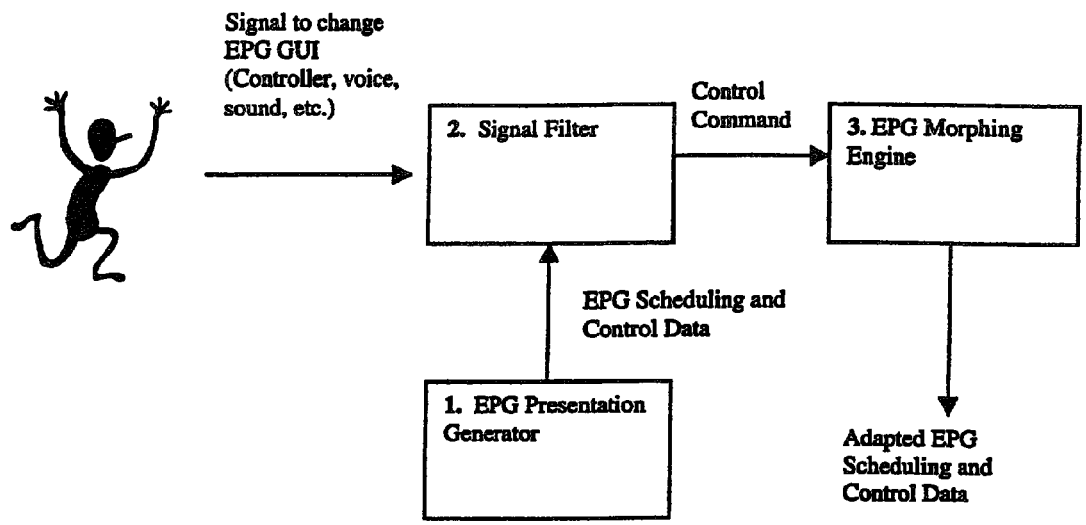
Adaptive Electronic Programming Guide diagram

METHOD AND SYSTEM FOR ADAPTIVE ELECTRONIC PROGRAMMING GUIDE

This application claims the benefit of U.S. Provisional Application No. 60/190,349, filed on Mar. 16, 2000, entitled METHOD AND SYSTEM FOR ADAPTIVE ELECTRONIC PROGRAMMING GUIDE.

BACKGROUND OF THE INVENTION

1. Field of the Invention

The invention relates to a television electronic program schedule system, which provides a user with schedule information for broadcast or cablecast programs or schedule information for cable, satellite, and over-the-air subscription television systems. More particularly, the invention relates to a system and process that allows an electronic programming guide designer to add a capability to change program listing appearance adaptively, based on a signal from a user or broadcaster.

2. Description of the Related Art

Prior art electronic programming guides ("EPGs") provide television viewers with on-screen television schedule information presented, e.g., in a convenient, regular or non-regular rectangular grid format. One type of EPG is used in conjunction with an analog television system. That type of EPG sometimes is called a passive programming guide ("PPG"). In such a system, one of the cable channels is reserved for displaying programming information. The programming information is displayed in a grid pattern. The first column lists the various channels of the cable broadcast system. Additional columns, e.g., columns two, three and four, display program information for what is showing on the channels listed in the first column, in half-hour increments. For example, suppose that a person tunes to an EPG at 10:35 p.m., the second column would display program information for 10:00-10:30 p.m., the third column would display program information for 10:30-11:00 p.m., and the fourth column would display program information for 11:00 p.m.-11:30 p.m. A row at mid-screen displays the time slots relating to the second, third and fourth columns. A portion of the television ("TV") screen typically provides continuous advertisements.

Cable TV systems typically provide more television channels than there is space for rows in a useable grid pattern. A grid is typically used that scrolls at a pre-selected slow rate, so that a viewer can see what is showing on all of the channels. In the case of satellite broadcasts, the situation becomes even more complex. Digital satellite TV systems may provide 1,000 TV channels with various TV programs and services.

The program schedule information contained in an analog EPG is typically broadcast by an operator on a dedicated one of the channels of the cable TV system. However, most digital EPGs operate in a different way. In a digital EPG, program schedule information and sometimes applications and/or systems software is transmitted to equipment located on the viewer's premises (e.g., a digital set-top box) by way of broadcast, cable, direct satellite or other suitable form of transmission. A digital set-top box ("STB") serves to deliver compressed digital video, data and audio signals in real time usable form to one or more TV sets. The STB, which is basically a dedicated computing device, contains memory allowing the program schedule information to be stored for later viewing. The program schedule information stored in the STB is periodically updated, e.g., on a continuous, daily, weekly, or biweekly basis or any other useful pattern. A microprocessor within the STB utilizes the viewer's TV set to display the stored program schedule information and to implement other functions of the EPG in response to user-generated signals. The functions available to the viewer vary depending on the sophistication of the particular EPG and hardware capabilities.

Digital EPGs are often used in an interactive television system and are sometimes called interactive programming guides ("IPGs"). In an interactive television system EPG, a user may browse schedule information in any order, select programs from on-screen menus for current or future viewing, and order pay-per-view programming on demand. Some advanced EPGs permit other functions, e.g., an e-mail function, or a function that permits a user to block certain kinds of programs, such as adult or violent programs, and choose favorite channels. Prior art digital EPGs, however, collectively fail to provide viewing capabilities that realistically address the viewing habits of the users of these systems.

As mentioned above, an analog TV EPG is viewed on a TV screen as a continuously scrolling rectangular table. This solution does not allow any user interaction and is suitable only for the passive television viewer. This is a poor solution for interactive TV, because:

1. The scrolling speed is set upfront (it is not necessarily constant) and cannot be adjusted by user's request.
2. In an analog EPG system, the user cannot switch to the channel of choice immediately from the EPG (e.g., by clicking on a display of a channel number on the EPG). Instead, the user must input the channel number with a remote controller.
3. The analog EPG scrolling table is completely sequential (providing information in an order depending upon channel number and designer's chosen style) and the user cannot pre-sort schedule data or otherwise personalize the EPG or IPG.

A more sophisticated solution is the interactive EPG ("IPG"). Unfortunately, existing solution have their own problems. For example, interactive EPG systems provide drop-down menus that require multiple steps in order to interact with the EPG, which can lead to user frustration when a search for a desired program is unsuccessful or simply too complicated. As known today, interactive EPGs are inflexible in terms of menu design, because the menu itself is a set of regular two-dimensional grids.

Additional problems with the prior art electronic programming guides are listed below.

1. Program Description Truncation. When displaying schedule information in grid format, i.e., columns representing time slots and rows representing channels, program titles are generally truncated to fit into the cells of the grid. The width of a grid cell varies with the program duration. Since a 30-minute program is allotted only a small space for the program title and description, titles and/or descriptions for half- and even full-hour programs often must be truncated to fit in the allotted space. Some systems simply cut off the description of a program without abbreviating it in any way, such that the user cannot determine the subject matter of the program. While some systems partially alleviate this problem by providing two lines of text in each grid cell, this is a less than ideal solution because program descriptions may still be truncated.
2. Inability to Create a Program Itinerary While Viewing a TV Program. Prior art EPGs lack a method for a user to create a program itinerary, electronically, concurrently while the user views a program on the TV screen. Thus, when a user views a program on a particular channel, he or she cannot electronically set up a sequence of other channels to surf.
3. Inability to Simultaneously Channel Surf and View EPG. Prior EPGs leave much guess work for the user as he or she navigates through a sequence of channels. When skimming through channels and trying to determine what program is being displayed on a channel, commonly known as "channel surfing," the user must guess which program is currently being aired from the video segment encountered during channel surfing. Since up to thirty percent of the programming appearing on a channel at any given time is advertising, the user is not provided with any clues as to what program is showing on a selected channel at a given time. Hence, the user often has no choice but to wait until an advertisement or commercial ends before learning what program is showing on the selected channel. Existing solutions allow user to go to the channel and find more information by using a special button of remote control, i.e., "info" button. Thus, a need exists for an EPG that displays current program schedule information for each channel at the same time that the user surfs through the channels.

4. Text Size. Unfortunately, existing EPGs allow for only one font size. However, human beings do not all have the same acuity of vision. As a result, two problems appear: some viewers may have difficulty or even be unable to read the information in the EPG and some viewers want to see more information using smaller font.

5. Specular Highlighting. Existing EPGs provide only a very rudimentary lighting capability. For example, existing EPGs do not have an adequate means to adjust the brightness of the EPG. This detracts from the utility of the EPG.

Thus, methods and apparatus for generating a two-dimensional ("2D") television TV graphical user interface ("GUI") for providing TV program guides on a TV screen are known in the art. A conventional TV GUI uses a single layer of on-screen display graphics to present TV program information and, typically, multiple menus are provided to enable users to navigate through the presented information. For example, an apparatus that generates a main menu of a program guide, which includes program source information and program event information for a plurality of program sources, and further generates navigation menus for allowing a viewer to modify the program guide is disclosed in U.S. Pat. No. 5,694,176, issued Dec. 2, 1997 to Bruette et al. A system and a process in which a program listing is displayed as a grid of two-dimensionally arranged adjacent irregular cells, which vary in length corresponding to time duration of the programs, with a title of a program being displayed in each of said irregular cells, said grid having a plurality of channels listed in a first dimension and time listed in a second dimension, is disclosed in U.S. Pat. No. 5,809,204, issued Sep. 15, 1998 to Young. A multi-layered TV GUI that uses a memory for storing graphics data that is capable of storing two graphics planes that represent upper and lower layers of graphics displayable on a TV screen, and that uses a graphics accelerator to combine the graphics planes to produce various graphical effects on the screen is disclosed in U.S. Pat. No. 6,016,144, issued Jan. 18, 2000 to Blonstein et al. One advantage of a multi-layered TV GUI that produces multiple layers of graphics on a TV screen is that it eliminates the need for a multi-menu hierarchical system. (A hierarchical menu system often causes confusion when the user loses track of the menu that he or she came from and how to get back.) A variety of other TV GUI are disclosed in the following additional issued patents: U.S. Pat. No. 4,706,121, issued Nov. 10, 1987 to Young (hereinafter "Young '121"); U.S. Pat. No. 5,781,246, issued Jul. 14, 1998 to Alten et al.; U.S. Pat. No. 5,986,650, issued Nov. 16, 1999 to Ellis et al.

Thus, the art of displaying TV EPGs is known. It would be desirable, however, for a viewer to be able to modify the user interface according to individual preferences as to data format for display. Young '121" discloses a system that allows a user to control a television set by selecting broadcast programs for viewing from schedule information with user-supplied selection criteria. However, there are many otherwise helpful features that cannot be achieved in a useful manner within the scope of existing EPG systems. For example, it would be desirable for viewers with eye-related problems to be able to modify the user interface to display a larger font resolution.

In the case of HDTV, it would be desirable for a viewer to be able to modify the user interface to use different font styles and/or font sizes that allow the user to increase the amount of scheduling data displayed on the television.

It would be desirable for a viewer to be able to view titles in EPG icons (images) instead of text. Additionally, it would be desirable for a user to be able to vary the resolution of said images.

It would be desirable for the system to allow the user to completely change topology of data representation based on a user request.

What is clearly needed is a method and system to allow individual users to have different preferences for data arrangement on the TV screen.

SUMMARY OF THE INVENTION

Accordingly, this invention provides a television schedule system and process that allows an electronic programming guide designer to add a capability to change program listing appearance adaptively, based on a signal from a user or broadcaster.

The system and process of the present invention allows a user with eye-related problems to be able to modify the user interface to increase the font size, change font type or background.

The present invention allows a user of the EPG to modify the user interface to use different font styles and/or font sizes that allow a user to increase the amount of scheduling data displayed on the television.

The invention allows a user to view titles in EPG icons (images) instead of or together with text. In addition, the present invention allows a user to vary the resolution of said images by applying a combination of graphics, video and text in any form or manner to the texture maps used on the 3D objects for display.

The invention in one aspect provides a system and process that allows a user to completely change topology of data representation based on a user request, by giving the user the tools that allow him to re-arrange objects, or allow him to choose from a number of pre-arranged options.

BRIEF DESCRIPTION OF THE DRAWINGS

The present invention is illustrated by way of example, and not limitation, in the figures.

FIG. 1 is a block diagram showing the components of the present invention.

DETAILED DESCRIPTION OF THE INVENTION

This invention relates to an EPG presentation engine. More particularly, the invention relates to a system and process that allows an electronic programming guide designer to add a capability to change program listing appearance adaptively, based on a signal from a user or broadcaster.

Description of the Hardware

In one embodiment of the present invention, the hardware used to practice the invention includes the following:

1. A CPU such as a Celeron or Pentium, e.g., manufactured by Intel Corporation, or any other similar or equivalent CPU.
2. A non-volatile memory, e.g., a ROM, EPROM, EEPROM, EAROM, hard disk, CD ROM, or other memory device.
3. A second main memory device, typically a RAM or magnetic disk, but in some cases other suitable technologies may be used.
4. A graphics accelerator circuit.

FIG. 1 is a block diagram showing the system components of the present invention. Physically, these system components can be located in a user's set-top box or other signal reception or processing device. Alternatively, the components can be included as part of a television receiver, VCR, multimedia player, PC or PC-like system.

EPG Display Generator 1 generates a displayable television schedule. In one embodiment, a schedule can be displayed as multi-dimensionally arranged irregular cells, which vary in length. In other embodiment, a schedule can be displayed as a three-dimensionally arranged set of 3D surfaces textured by pre-processed scheduling data.

Based on an external event, which can be time-related (e.g., reaching of next hour block) or a user-related signal (e.g., remote-controller signal, sound, and/or gesture), Signal Filter 2 generates a control command to EPG Morphing Engine 3.

Various types of EPG Morphing Engine 3 are possible which change EPG topology (representation) based on a control command generated by Signal Filter 2.

One implementation of EPG Morphing Engine 3 includes a list (database) of different presentation solutions. Based on a control command, one specific solution would be chosen and used for data representation.

Another implementation of EPG Morphing Engine 3 includes a set of parametrical functions. A control command creates a request for a specific function and its parameters.

Another implementation of EPG Morphing Engine 3 includes a mix of presentation solutions and functions. A control command creates a request for a specific implementation or allows selection of a specific function and adapting its parameters.

The system and process of the present invention allows a user with eye-related problems to be able to modify the user interface to increase the font size. This sizing of fonts is not possible using EPG of prior art with character generators. Also, using sizeable fonts, an issue still exists with no space available. Using 3D allows an object to be moved closer to the virtual viewer position, such allowing the font to become bigger without destroying the layout, but rather temporarily cover up some sections.

The present invention allows a user of the 3D EPG to modify the user interface to use different font styles and/or font sizes that allow a user to increase the amount of scheduling data displayed on the television.

The invention in one aspect provides a system and process that allows a user to completely change topology of data representation based on a user request, by giving the user the tools that allow him to re-arrange objects, or allow him to choose from a number of pre-arranged options.

A signal filter is a trigger for an event based on reaching of a trigger condition previously programmed into it based either on user and or provider programmed and or selected criteria.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

The invention claimed is:

1. A method comprising:
   receiving, at a broadcast receiving device, electronic programming guide data from a broadcast source;
   receiving, at the broadcast receiving device, a user request to modify an electronic programming guide configured to display the electronic programming guide data;
   receiving, at the broadcast receiving device, one or more presentation criteria for making the user requested modification from the broadcast source;
   determining, at the broadcast receiving device, at least one of the one or more presentation criteria corresponds to the user request; and
   in response to determining that at least one of the one or more presentation criteria corresponds to the user request, modifying the electronic programming guide using the at least one of the one or more presentation criteria to display an electronic programming guide in accordance with the user request and temporarily changing an object within the electronic programming guide without modifying the layout of the electronic programming guide.

2. The method of claim 1, wherein the modification request includes a selection of a predefined display layout from a database storing a plurality of predefined display layouts.

3. The method of claim 1, wherein the broadcast receiving device comprises a set-top box.

4. The method of claim 1, wherein the electronic programming guide comprises a three-dimensionally arranged set of surfaces textured by pre-processed broadcast program scheduling data.

5. One or more computer readable media storing computer readable instructions that, when executed, cause a processor to perform a method comprising:
   receiving electronic programming guide data from a broadcast source;
   receiving a user request to modify an electronic programming guide configured to display the electronic programming guide data;
   receiving, from the broadcast source, one or more presentation criteria for making the user requested modification;
   determining at least one of the one or more presentation criteria corresponds to the user request; and
   in response to determining that at least one of the one or more presentation criteria corresponds to the user request, modifying the electronic programming guide using the at least one of the one or more presentation criteria to display an electronic programming guide in accordance with the user request and temporarily changing an object within the electronic programming guide without modifying the layout of the electronic programming guide.

6. The one or more computer readable media of claim 5, wherein the user requested change corresponds to a selection of a predefined display layout from a database storing a plurality of predefined display layouts.

7. The one or more computer readable media of claim 5, wherein the user request includes a change in a position of at least a portion of the electronic programming guide.

8. The one or more computer readable media of claim 5, wherein receiving a user request includes detection of a sound or a gesture.

9. An apparatus comprising:
- a processor; and
- memory configured to store computer readable instructions that, when executed by the processor, cause the processor to perform a method comprising:
  - receiving electronic programming guide data from a broadcast source;
  - receiving a user request to modify an electronic programming guide configured to display the electronic programming guide data;
  - receiving, from the broadcast source, one or more presentation criteria for making the user requested modification;
  - determining at least one of the one or more presentation criteria corresponds to the user request; and
  - in response to determining that at least one of the one or more presentation criteria corresponds to the user request, modifying the electronic programming guide using the at least one of the one or more presentation criteria to display an electronic programming guide in accordance with the user request and temporarily changing an object within the electronic programming guide without modifying the layout of the electronic programming guide.

10. The apparatus of claim 9, wherein the user requested change corresponds to a selection of a predefined display layout from a database storing a plurality of predefined display layouts.

11. The apparatus of claim 9, wherein the user request includes a change in a position of at least a portion of the electronic programming guide.

12. The apparatus of claim 9, wherein receiving a user request includes detection of a sound or a gesture.

13. The apparatus of claim 9, wherein the user request includes rearranging the position of at least a portion of the electronic programming guide data within the electronic programming guide.

* * * * *